United States Patent [19]

Lang

[11] 4,017,245
[45] Apr. 12, 1977

[54] APPARATUS FOR EXTRUDING EXPANDABLE THERMOPLASTIC MATERIAL

[75] Inventor: Theo Lang, Leominster, Mass.

[73] Assignee: Foster Grant Co., Inc., Leominster, Mass.

[22] Filed: July 26, 1974

[21] Appl. No.: 492,129

[52] U.S. Cl. .............................. 425/327; 264/46.1; 264/46.2; 425/371; 425/817 C
[51] Int. Cl.² .......................................... B29D 27/04
[58] Field of Search ............ 264/45.5, 46.1, 46.2, 264/46.3, 45.9; 425/115, 371, 372, 4 C, 817 C, 329, 224, 466, 327, 376

[56] References Cited

UNITED STATES PATENTS

| | | | |
|---|---|---|---|
| 1,252,821 | 1/1918 | Lewis | 425/466 |
| 3,003,245 | 10/1961 | Nunez, Jr. | 425/376 X |
| 3,188,690 | 6/1965 | Zieg | 425/327 |
| 3,792,953 | 2/1974 | Ahrweiler | 425/371 |
| 3,795,470 | 6/1972 | DeMets | 425/371 |
| 3,895,898 | 7/1975 | Theysohn | 425/325 |

FOREIGN PATENTS OR APPLICATIONS 85,838  12/1971  Germany ............ 425/371

Primary Examiner—Francis S. Husar
Assistant Examiner—Mark Rosenbaum
Attorney, Agent, or Firm—Leonard S. Selman

[57] ABSTRACT

Method and apparatus for extruding expandable thermoplastic material having a cellular internal body portion and formed thereon a substantially non-cellular high density skin. The extruded material is contacted by a pair of continuously traveling temperature controlled belts immediately upon leaving the extrusion die which serve to form the high density skin thereon and the spacing of the belts is selectively controlled downstream from the extrusion die with the use of selectively adjustable belt backing members. Selectively controlling the spacing of the belts while the extruded material is undergoing expansion or foaming results in a predetermined internal cellular structure of said extruded material especially with regard to the size and distribution of the cells across a cross-section of the material.

3 Claims, 3 Drawing Figures

APPARATUS FOR EXTRUDING EXPANDABLE THERMOPLASTIC MATERIAL

BACKGROUND OF THE INVENTION

In the past several years, there has been a continuing interest in the development of various forms of rigid expanded thermoplastic material in the higher density ranges. Such materials in the lower density ranges have already gained wide recognition for their insulating properties for such items as coolers and for its flotation property in boats, for example. In these uses and in others often the plastic foam, as it is called, has replaced other materials such as cork and the like.

Now the more rigid and dense expandable plastics are starting to be strongly considered as substitutes for wood in a variety of uses. Such uses include the manufacturing of picture frame material and for use as decorative molding material in construction. In these forms the expandable thermoplastic material can be extruded which is now generally accepted as the most practical manufacturing method for these types of foamed plastic products.

While generally directed to all extrusions of such expandable thermoplastic material this invention is particularly directed to the manufacture of larger panels of such extruded material which have a large variety of uses. With the use of these panels for such items as doors for cabinets or in the construction of full size room doors for example, certain requirements have become evident such as the necessity of producing a smooth outer surface or skin on such panels which emulates the surface of so-called finished wood. Of course, it is most desirable to produce such a surface without any secondary operations so that it is one object of this invention to produce such a smooth outer surface or skin on the material as it comes from the extruder. To provide such a surface it will be seen that it is necessary to eliminate at the outer surface of the material the formation of a cellular structure which is typical of all plastic foam. This integrally knit cellular structure will characterize the entire internal portion of the extruded material and it is another object of this invention to be able to carefully control the kind of cellular structure produced internally especially as to the size of the cells formed. The cell size and the cross-sectional uniformity of the cells from the inside to the surface of the extruded material will determine the density of the material as well as its load bearing characteristics and its weight all of which are of course important characteristics for its intended use as a wood substitute.

Of course, the material produced may have many other uses where it is not substituting for wood at all but will be selected for its own unique characteristics.

To elaborate further on the objects of the invention; it is an object to provide both a method and apparatus for the extrusion of an elongated body of expandable thermoplastic material having substantially smooth outer surfaces and a predetermined characteristic cellular inner structure.

It is a further object of this invention to provide a method and apparatus for providing an elongated body of expanded thermoplastic material which is useable as extruded requiring no surface finishing for its intended final use.

It is a still further object of this invention to provide a method and apparatus which can produce relatively inexpensively various elongated bodies of expandable plastic material which have many uses including that of a wood substitute.

SUMMARY OF THE INVENTION

Pursuant to the objects of the invention a mixture of thermoplastic polymer and a foaming agent is retained in a heated melted state in the barrel of an extruder under pressure and is then extruded through a die into an area of lower pressure. In this lower pressure environment the heated foaming agent will volatize and immediately begin to form a cellular structure within the extruded polymer body. Thus to prevent a cellular structure of the polymer at the outer surfaces thereof the surfaces are immediately subject to chilling to prevent volatilization of the foaming agent at the locality of the surfaces and mechanical pressure is applied thereto which results in a substantially non-cellular skin to be formed on the elongated body of the material. The chilling is accomplished by contacting opposing upper and lower surfaces of the mixture with a pair of driven metal belts which also serve to withdraw the material from the die. The belts pass over backing members which in the immediate vicinity of the die exit are shaped to constrain the elongated body as it is withdrawn. Thus the body is held in a narrow space between the pair of traveling belts as soon as it leaves the die and remains so constrained until it reaches a predetermined position spaced from the die where the space between the belts is allowed to widen in a controlled manner by means disclosed hereinafter. The material is constrained laterally by a pair of pressure members located on opposed sides of the extruded material. During the initial period after the body leaves the die the volatized blowing agent released due to the relatively high temperature in the internal portion of the body is prevented by the mechanical pressure exerted by the belts from expanding the body and forming any substantial cellular structure therewithin. Only when the space between the belts is allowed to widen in a controlled manner does the expansion of the plastic material occur as a result of the cellular structure formed internally of the extruded body. This widening is accomplished with the use of a plurality of adjustable backing members which together providing the backing for at least one of the belts beginning at a position spaced from the die and extending downstream for a predetermined distance. The adjustability of these backing members make it possible to allow the space between the belts which constrain the elongated body of extruded plastic material to widen more or less quickly as desired. This will in turn determine the internal cellular structure and density of the extruded body.

DESCRIPTION OF THE PREFERRED EMBODIMENT

This invention is applicable to the production of elongated cellular bodies, i.e. panels, planks, boards, etc. from extrudable expandable thermoplastic material. These materials are commonly known as foamable or expandable plastic material since they usually consist of a mixture of synthetic thermoplastic resins which have included therein a forming or expanding agent which upon activation by heat, for example, volatize to form a gas which foams or produces cells in the melted plastic. The plastic is then allowed to cool and when reaching its setting temperature will then solidify incorporating the cellular structure in its interior.

A wide range of these plastic materials is envisioned for use in the present invention including solid thermoplastic benzene-soluble polymers and copolymers of monovinyl aromatic compounds such as monovinyl aromatic hydrocarbons of the benzene series having the vinyl rubber. It bonded directly to a carbon atom of the aromatic nucleus and nuclear halogenated derivatives thereof. Among such monovinyl aromatic compounds are styrene, vinyltoluene, vinylxylene, ethylvinylbenzene, para-chlorostyrene, meta-chlorostyrene, para-isopropylstyrene, para-bromostyrene, and ethylvinyltoluene. Copolymers of any two or more of such monovinyl aromatic compounds may also be used. The method may also be used in producing cellular products from thermoplastic resins such as polymethylmethacrylate, and copolymers of methylmethacrylate and styrene, or copolymers of styrene and alpha-methylstyrene. The method is also applicable to graft polymers and to polymers with which have been compounded other modifying agents, i.e. polystyrene containing a small amount of rubber. It is likewise suitable for other hydrocarbons, such as polyethylene, polypropylene, polyisobutylene and their mixtures.

The foaming or expanding agents found suitable in the present process can be a gas which expands upon release or pressure to foam the plastic, a liquid which will vaporize to a gas and expand the plastic upon release of pressure, a solid which on decomposition releases a gas, i.e. an ammonium or azo type compound, or combinations of such gases, liquids, and solids. As examples of suitable normally gaseous agents there may be employed paraffins such as propane or butane or mixtures thereof, or cracked petroleum fractions. Similarly, olefins, such as ethylene, propylene, butylene, etc., and mixtures thereof can be used to advantage. Suitable normally liquid blowing or expanding agents include methyl chloride, higher paraffins such as pentane, or hexane, freons, water, etc. In addition, more permanent gases such as carbon dioxide, nitrogen or air can be employed. Ammonium and azo type compounds useful in the process include ammonium carbonate, ammonium bicarbonate, potassium bicarbonate, diazoaminobenzene, diazoaminotoluene, azodicarbonamide, diazoisobutyronitrile, etc.

Figure 1:
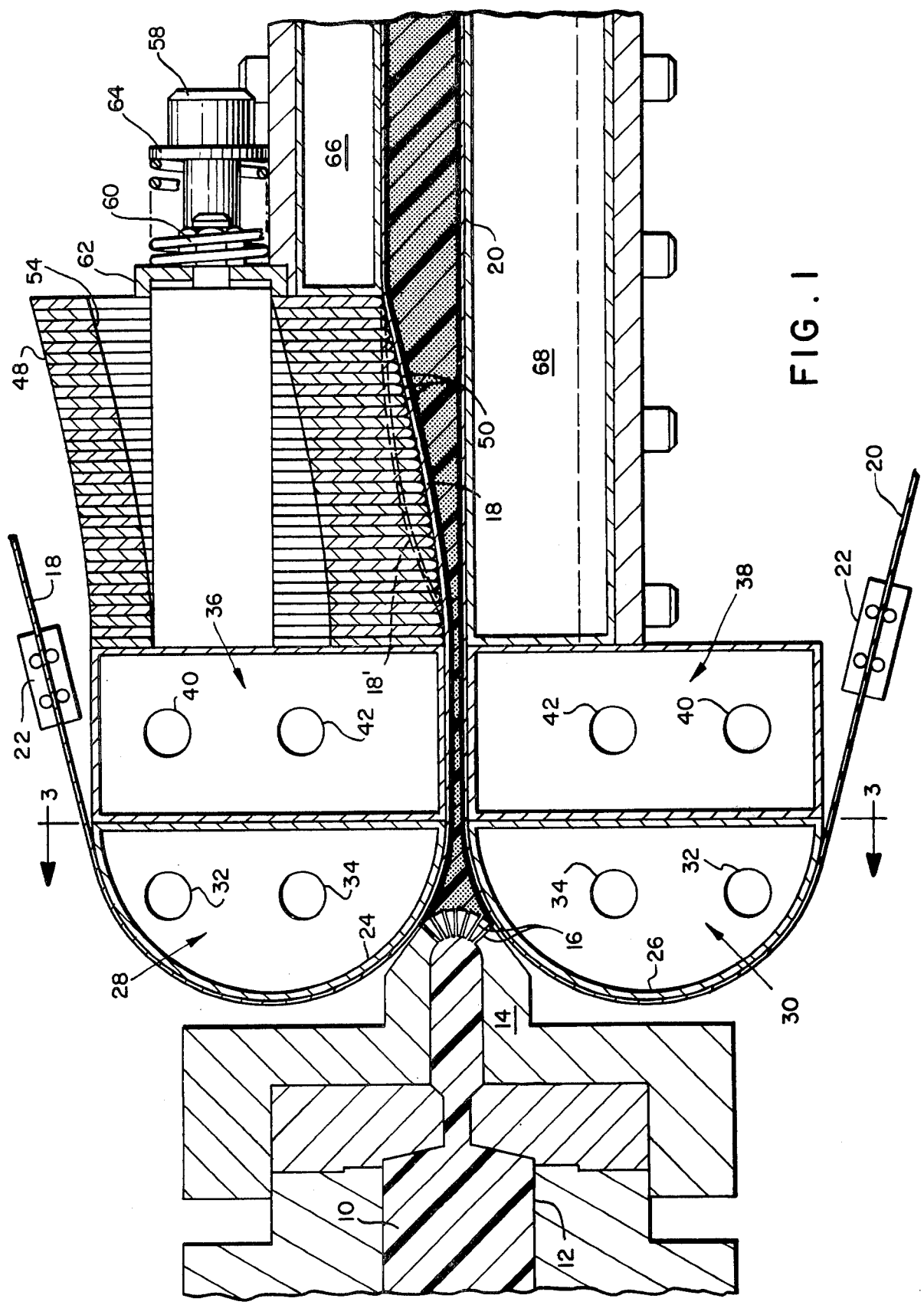
FIG. 1 is a fragmentary view in longitudinal section taken on line 1—1 of FIG. 2 of an apparatus shown partly schematically embodying the present invention.

For illustrative purposes the invention will be described as utilizing polystyrene as the plastic material and pentane as the foaming and expanding agent. With reference to FIG. 1 a continuous supply of expandable polystyrene pellets prepared by known methods are prepared such that they incorporate an amount of liquid pentane therein. In practice the expanding agent could also be incorporated into the molten resin in the barrel of an extruder by means of a high pressure pump. The resin and expanding agent mixture 10 is shown in its melted condition under pressure in the vicinity of the front of an extruder barrel 12 which includes a screw (not shown) which serves to place the mixture under pressure in the barrel and forcefully extrude the material through a die 14. The die 14 is positioned at the front end of the extruder barrel and is preferably of the multiple orifice type. Thus it may have a plurality of orifices 16, each for example 1/16th in diameter and equally spaced apart on a spherical die plate as shown in FIG. 1. The number of orifices will depend upon the final dimensions and desired foam structure of the body to be extruded. For the manufacture of a wood substitute material requiring a substantially high density a great number (i.e. many hundreds) of small closely spaced orifices are required to make a panel of substantial dimensions. While it is conceivable that a single slit or orifice could be provided in a die for extruding such a board it has been found that the multiple orifice die plate is superior in the ability to control the dimensions, surface characteristics and cellular inner structure of such bodies.

As the mixture is extruded through the multiple orifices and leaves the die, it is formed into individual elements in strand form which as a result of the pressure drop across each orifice will almost immediately begin to expand. This temperature of the mixture is such that the liquid pentane will volatilize under the reduced pressure forming a gas which begin to form a cellular structure within the extruded body and expand the diameter of each strand. Due to the proximity of the individual foam strands as they expand they fuse or coalesce into an integral body. An example of such a body having however a much lower density than the bodies contemplated by the present invention is disclosed in U.S. Pat. No. 3,573,152.

As shown in FIG. 1 special means are provided for forming a molecularly integral skin of essentially unexpanded material on the outer surface of the extruded material. This skin forming means includes a pair of thin metal driven endless belts 18 and 20 preferably made of thin sheet steel which contact the upper and lower surfaces of the extruded material immediately upon its leaving the outer orifices 16 of the die. The belts are driven by known variable speed driving means 22 schematically illustrated in FIG. 1. The belts should preferably contact the upper and lower opposed surfaces of the extruded material within about the first one-sixteenth to one-eighth of an inch after it leaves the die. The steel belts are brought to a desired temperature before contacting the extruded material by passing them over the temperature conducting (i.e. metal) outer walls 24 and 26 of a pair of temperature controlling chambers 28 and 30. The chambers are each provided with a pair of inlet and outlet openings 32 and 34 through which temperature controlling fluid, i.e. water, may circulate therethrough. The belts 18,20 upon contacting the extruded material will lower the surface temperature thereof thus preventing the expanding agent from volatilizing and forming the cellular structure on the outer surface of the material. Further if there is any chance that the chilling of the skin on the material is not adequate to prevent the beginning of cell structure formation pressure applying means is also provided tending to collapse any cell structure and causing the material which is still in a heated state to flow and form the desired smooth surface skin.

The mechanical pressure applying means is in the form of constraining type backing members for the steel belt 18 to pass over. The constraining type backing members or means for the belt 18 comprise the outer chamber walls 24 and 26 of the chambers 28 and 30. The configuration of such walls 24 and 26 as shown in FIG. 1, are such that the space between the opposing belts 18 and 20 diminishes in a direction away from the opening for a predetermined distance. Thus the belts acting in concert with the constraining type backing members will apply pressure to the material especially as the material as explained previously is in a state of expansion due to the release of the gaseous expanding agent. This force of expansion together with the initial lessening of the distance between the belts will exert a strong pressure against the material surface insuring a non-cellular skin on the extruded material as explained above. The use of such driven endless belts 18 and 20 to move the extruded material downstream from the die also has the advantage of alleviating any drag the material would experience if moved against stationary surfaces, for example. Thus any drag lines are avoided on these belt contacted surfaces and a better surface finish then could otherwise be obtained is accomplished in a simple but effective manner. Drag of the material against a stationary surface could even cause rupture cracking and distortion of the extruded material all of which is avoided by the use of the driven belts. In the downstream direction from temperature controlling chambers 28 and 30 are another set of chambers 36 and 38 whose outer chamber walls 40 and 42 also serve as constrainment type belt backing members. Chambers 36 and 38 also have inlet and outlet openings 40 and 42 through which temperature controlling fluid, i.e. water, may circulate therethrough.

Figure 2:
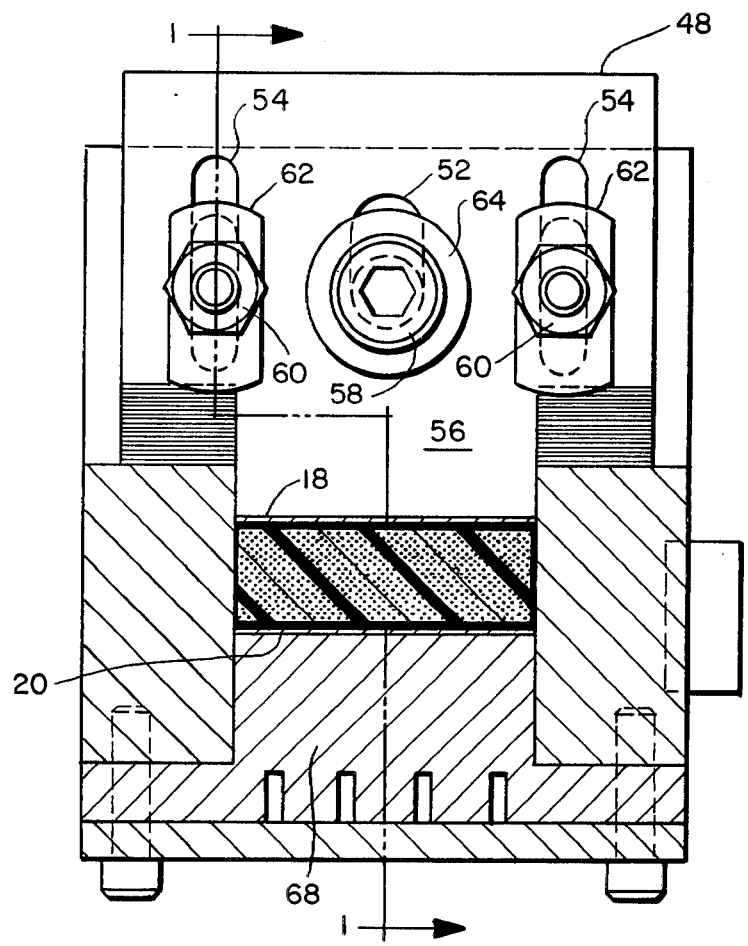
FIG. 2 is an end view of the apparatus shown in FIG. 1 looking toward the die.
Figure 3:
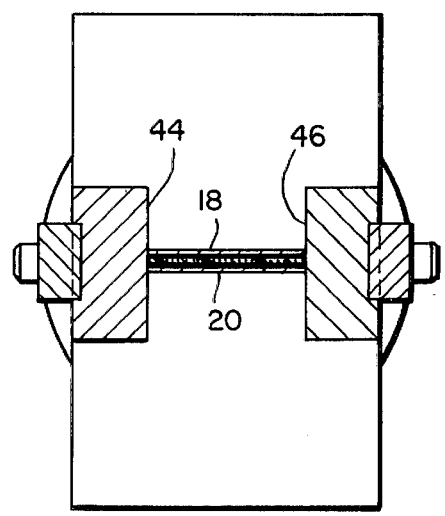
FIG. 3 is a sectional view taken on lines 3—3 in FIG. 1.

The side portions of the extruded material are likewise provided with a substantially non-cellular skin by means of two metal pressure members 44 and 46 which are shown in FIG. 2 as being clamped tightly in place. These members may be made of metal such as steel having polished surfaces which are preferably coated with a non-skicking synthetic coating material, preferably polyetrafluoroethylene marketed under the trademark "Teflon" by DuPont Corp. of Wilmington, Delaware. By confining the material in the sidewise or lateral direction the members 28 and 30 will provide pressure against the contacted surfaces as the extruded material experiences the expansion described as it leaves the die and is drawn away therefrom by belts 18 and 20. Thus the pressure of the material against the Teflon coated surfaces will tend to collapse any cell structure and cause the material to form a substantially smooth surface skin on the sides also. The Teflon coating on the members 44 and 46 will tend to reduce the amount of drag the material experiences at the sides thereof. The opposing belts 18,20 are important in this respect in that the top and bottom of the extruded material avoid any problem of drag thereon as they are carried away from the die by the belts.

As can be seen in FIG. 1 the belts 18 and 20 initially follow a path wherein the space between them contracts for a predetermined length and then remains constant for a predetermined length of belt travel. During this time the material which has just left the die at a predetermined expansion temperature is cooled as it travels away from the die while being exposed to mechanical pressure due to its being confined by the belts 18 and 20 and members 44 and 46 as explained above while undergoing expansion. The speed of belt travel which is also predetermined is of course another important factor and the above-mentioned parameters of temperature, pressure and speed of travel combine with other parameters to provide a particular expansion profile in terms of selected combination of these parameters which may be controlled. The particular kind of thermoplastic material used as well as the kind and amount of expanding agent utilized are other parameters affecting the expansion profile.

This invention now introduces a further factor as parameter whereby the ultimate kind of internal cellular structure of the extruded material can be controlled. This is accomplished by providing as shown in FIGS. 1 and 2 a plurality of adjustable backing members 48 for the belt 18 which provide the backing for the belt 18 beginning at a position spaced from the die and extending for a predetermined length of travel of the belt. The adjustable backing members 48 as shown in FIG. 2 each consist of a thin T-shaped plate with the end 50 of each plate providing a portion of the adjustable backing surface over which belt 18 passes over. Top belt 18 is shown broken away in FIG. 2 to expose the backing members. As shown therein the belt contacting bottom portions 50 are formed with a radius and are formed of a material with appropriate wear properties. Each member 48 has a large central slot 52 and a pair of side slots 54 in body portion 56 thereof so that it may be slideably mounted on mounting bolts 58 and 60, respectively. A clamping member 62 is provided on each bolt 60 to clamp the backing members 48 in contact with one another in their adjusted positions when the bolts are tightened. Likewise a flange 64 on bolt 58 serves to clamp backing members 48 in their selected positions. A helical spring 65 urges the members 48 together so that they will not immediately slip when clamping members 62 are loosened. The slots 52 and 54 are made of a length so that the backing members 48 may be moved from a position wherein the edge 50 may provide as narrow a space between belts 18 and 20 as the constrainment type backing members 40 and 42 to a position wherein the edge 50 may provide as wide a space between belts 18 and 20 as the space between fixed backing members 66 and 68 located further downstream from the extrusion die. As shown the backing elements 48 cover a portion of travel of the extruded material wherein it is generally moving from a more confined state between the belts 18 and 20 to a state where the belts 18 and 19 are backed by members spaced further apart. The material during this portion of its travel is allowed to expand under the internal pressure of the expanding agent which is volatilizing within the material under the still relatively high internal temperature and forming the well-known cellular structure of such expanded thermoplastic material. The adjustable backing members 48 may be arranged in a variety of ways which will determine the amount of constrainment or mechanical pressure experienced by the expanding material as the belt advances the material during that portion of its travel. For example, the configuration of the backing members 48 instead of providing the smooth constantly widening space between the opposing belts as shown in FIG. 1 could provide a much more rapid widening of the space during the first half of such length of travel and a less rapid widening during the second half of travel. This condition is shown by the broken line 18' in FIG. 1 which indicates the belt spacing under those conditions. This difference in constrainment or mechanical pressure experienced by the material while undergoing cooling will be reflected in the internal cellular structure of the extruded material which is experiencing expansion under the differing forces placed thereon. If one would observe a cross-section of the extruded material he would find that the arrangement of the adjustable backing members 48 and upper belt path as shown in solid lines in FIG. 1 results in the material having a substantially unexpanded skin with a layer directly under the skin having a fairly small cellular structure and a central core of relatively larger cellular structure. If however the adjustment of the backing members 48 allow a more rapid widening of the spacing of the belts (see broken line in FIG. 1) as the material travels downstream a cross-section of the extruded material would disclose a substantially unexpanded skin and a wide central core thereunder having a relatively uniform fairly small cellular structure. For an explanation of the above, one must consider what is occurring to the material as it travels downstream from the extrusion die. Since the extruded material cools from the outside inwardly it can be seen that if the spacing between the belts widen more slowly as shown in solid lines in FIG. 1 a layer of the extruded material beneath the skin will have had time to cool before the spacing between belts widens significantly. Thus this layer under the skin which is cooled somewhat and beginning to set will only have a fairly small cellular structure formed therein while the hotter and softer material in the central core will be where most of the expansion of the material takes place producing the relatively large cellular structure in the core area. In contrast, if the spacing between the belts widens more rapidly as shown in broken lines in FIG. 1, a wide central portion of the extruded material will not have cooled as yet and will be soft and available for expansion to fill the wider spacing between the belts. Since more material is taking part in the expansion there will be a greater number of cells formed and the result will be a wide central portion of the material having a relatively small cellular structure (i.e. smaller than the cell size in the central core of the material described above when the belt path is shown in solid lines in FIG. 1, but larger than the cell size of the layer immediately beneath the skin of such material). As can be seen, another important parameter has been added which can be controlled in an expedient manner to produce the desired effect on the expansion profile of the material. By emperical methods the particular parameter to obtain a desired internal density, for example, can be determined for a particular expandable thermoplastic material such as an expandable polystyrene material.

Since the extruded plastic material is cooling from the time it leaves the die and is withdrawn therefrom by the belts there is a point in its travel downstream at which it reaches a temperature where it "sets" and becomes rigidified to a point where the expansion force of the volatilized expanding agent is not great enough to further expand the extruded material. In accordance with the present invention it is preferable that this setting temperature will be reached shortly past the point where the adjustable belt backing members 48 terminate in a direction downstream from the die. After the termination of the adjustable backing members both of the belts 18 and 20 will again be backed by backing members comprising the outer walls 66 and 68 of a pair of chambers 70 and 72 for the rest of the travel of the extruded elongated body which is then in a set condition. Chambers 70 and 72 may also be provided with means not shown allowing temperature controlling fluid to flow therethrough allowing them to regulate the temperature of the belts 18 and 20 passing over their temperature conductive (i.e. metal) outer walls 66 and 68 and contacting the extruded material to provide for further cooling thereof.

It is forseen that one may wish to adjust the spacing of the constraining type backing members 24,26 and 40,42 for a particular result either during assembly of the device or by providing means to adjust such spacing by appropriate mechanical adjusting means on the apparatus. Such a change in the spacing of the constrainment type backing members and the resultant change in constrainment forces transmitted to the material by belts 18 and 20 would of course result in changes in the internal cellular structure of the extruded material.

Thus attention is directed to Example I which illustrates a preferred embodiment of the invention.

EXAMPLE I

Using the apparatus as illustrated in FIG. 1, a mixture composed of 95 parts by weight polystyrene and 5 parts of pentane is extruded under 800 p.s.i.g. pressure at a temperature of 225° F. through a spherical die plate containing 1200 orifices each one-sixteenth inch in diameter to form a board 24 inches wide and three-fourths inch thick. The mixture passes out of the die into an area of atmospheric pressure, the upper and lower surface of the material being contacted immediately by a pair of endless steel belts maintained at a temperature of about 80° F. and driven at a pull off speed of about 1 foot per minute. The material reaches the point of travel wherein the belts are backed by the adjustable backing members 32 after about 10 seconds of travel at which time the temperature of the material has partially cooled and it reaches its setting temperature of about 120° F. a little past the time the material passes the last adjustable backing member on its way downstream. For this example, the adjustable backing members being at a point about two and one quarter inches downstream from the die and extend for about three inches and are adjusted in the positions as shown in full lines in FIG. 1. Upon inspection the foamed board is found to have an interior with a relatively small uniform cellular structure of a density of about 10 pounds per cubic foot. The outer integral surface of the board has a substantially smooth unexpanded integral skin.

Since certain changes may be made in the above method and apparatus as will be apparent to those skilled in the arts related to the invention disclosed herein, it is intended that all matters contained in the above description or shown in the accompanying drawings shall be interpreted as illustrative and not in a limiting sense.

I claim:

1. Apparatus for the continuous production of thermoplastic foam material having formed thereon a molecularly integral substantially non-cellular high density skin and a cellular internal body portion comprising:
   an extruder including a chamber from which material including a mixture of molten thermoplastic polymer and a foaming agent is discharged;

an extrusion die located at the downstream end of said extruder through which said material is continuously discharged into a receiving area;

a pair of continuously traveling temperature controlled substantially thin metal belts following a path, a portion of which is positioned immediately adjacent said extrusion die so that said belt may immediately contact opposing upper and lower surfaces of said material as it is discharged in a foaming condition in which it expands to fill the receiving area, said belts serving as means to continuously withdraw said material from said extrusion die and to form a substantially non-cellular smooth molecularly integral skin on said extruded material;

temperature controlling means downstream of said extruder which maintain the surface temperature of said belts within a predetermined temperature range;

stationary constrainment type belt backing means for said traveling belts located in the vicinity of said extrusion die and having a configuration which causes said belts to follow a path which place initial forces of constrainment on said mixture while being withdrawn from said die;

a pair of pressure members located on either side of the extruded material which constrain the material in a lateral direction as it is moved downstream between the pair of continuous traveling belts; and a plurality of selectively adjustable stationary belt backing members spaced downstream a predetermined distance from said die and said constrainment type belt backing means and over which at least one of said belts travels which selectively relieve the constraining forces placed on the material by said belts and said pressure members during the time period coincident with the length of travel of said belts over said adjustable members resulting in a predetermined cellular internal structure of said extruded material, each of said selectively adjustable stationary belt backing members including a substantially thin edge surface over which said belt travels and a body portion including at least one slot by which said member may be slideably positioned and clamped in a selected belt backing position.

2. The apparatus of claim 1 wherein said selectively adjustable belt backing members are clamped in position so that they engage one another to form the desired belt backing profile.

3. The apparatus of claim 2 wherein said extrusion die has an outer spherical contour and includes a plurality of spaced openings over the entire outer spherical contour through which the mixture of molten thermoplastic polymer and foaming agent are extruded in strand form, said strands being coalesced into an elongated cellular body upon expansion of said polymer mixture.

* * * * *